United States Patent
Mead

(10) Patent No.: US 7,904,645 B2
(45) Date of Patent: Mar. 8, 2011

(54) FORMATTING DISK DRIVE DATA USING FORMAT FIELD ELEMENTS

(75) Inventor: John P. Mead, Longmont, CO (US)

(73) Assignee: Broadcom Corporation, Irvine, CA (US)

(*) Notice: Subject to any disclaimer, the term of this patent is extended or adjusted under 35 U.S.C. 154(b) by 483 days.

(21) Appl. No.: 11/972,676

(22) Filed: Jan. 11, 2008

(65) Prior Publication Data
US 2009/0086359 A1    Apr. 2, 2009

Related U.S. Application Data

(60) Provisional application No. 60/976,277, filed on Sep. 28, 2007.

(51) Int. Cl.
*G06F 12/00* (2006.01)
(52) U.S. Cl. ............ 711/112; 712/41; 714/752; 360/903
(58) Field of Classification Search .................. 711/112; 712/41; 360/71, 903; 714/752
See application file for complete search history.

(56) References Cited

U.S. PATENT DOCUMENTS

| | | | | |
|---|---|---|---|---|
| 5,617,432 A | * | 4/1997 | Eggenberger et al. | 714/752 |
| 2008/0270755 A1 | * | 10/2008 | Mead | 712/41 |

* cited by examiner

*Primary Examiner* — Yong Choe
(74) *Attorney, Agent, or Firm* — Garlick Harrison & Markison; Shayne X. Short

(57) ABSTRACT

Formatting disk drive data using format field elements (FFEs). A processing module (which can be a general purpose processor or a RISC (Reduced Instruction Set Computer) processor) is employed to generate FFEs that are employed to govern operation of the various data formatting modules within a formatting system within a HDD. The determination of when a data formatting module stops operating in accordance with a first FFE and begins operating in accordance with a second FFE can be a predetermined period of time, a number of operations being performed, the meeting of some condition, or some other means. Each FFE can be viewed as being a multi-dimensional instruction that not only includes a configuration for a data formatting module, but also includes the conditions by which the configuration is to be governed by a subsequent FFE, among other things.

20 Claims, 13 Drawing Sheets

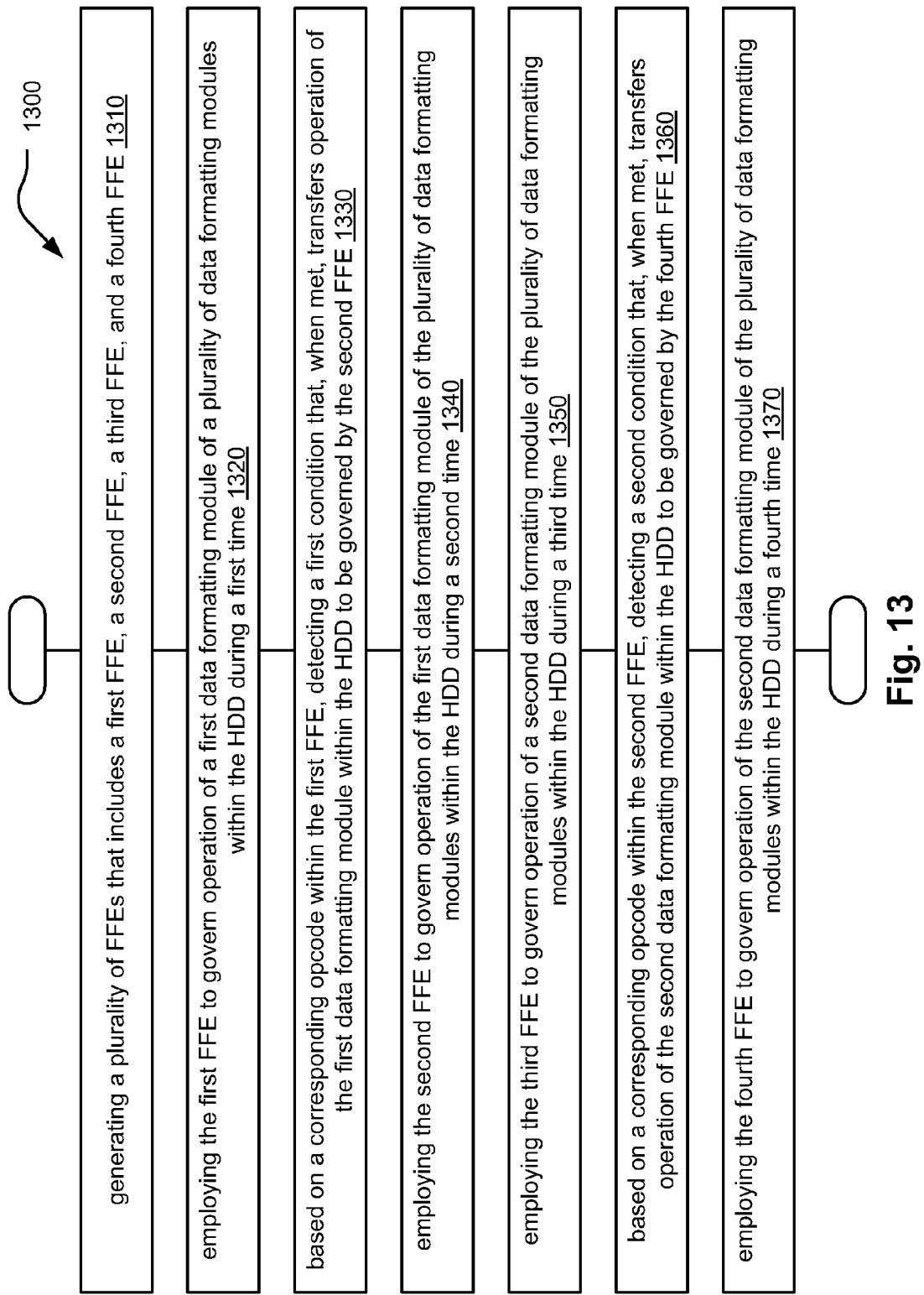

FORMATTING DISK DRIVE DATA USING FORMAT FIELD ELEMENTS

CROSS REFERENCE TO RELATED PATENTS/PATENT APPLICATIONS

Provisional Priority Claims

The present U.S. Utility patent application claims priority pursuant to 35 U.S.C. §119(e) to the following U.S. Provisional patent application which is hereby incorporated herein by reference in its entirety and made part of the present U.S. Utility patent application for all purposes:

1. U.S. Provisional Application Ser. No. 60/976,277, entitled "Formatting disk drive data using format field element," filed 09-28-2007, pending.

BACKGROUND OF THE INVENTION

1. Technical Field of the Invention

The invention relates generally to configuring processing modules within a hard disk drive (HDD); and, more particularly, it relates to configuring processing modules within a HDD using format field elements.

2. Description of Related Art

As is known, many varieties of memory storage devices (e.g. hard disk drives (HDDs)), such as magnetic disk drives are used to provide data storage for a host device, either directly, or through a network such as a storage area network (SAN) or network attached storage (NAS). Such a memory storage system (e.g., a HDD) can itself be viewed as a communication system in which information is encoded and provided via a communication channel to a storage media; the reverse direction of communication is also performed in a HDD in which data is read from the media and passed through the communication channel (e.g., sometimes referred to as a read channel in the HDD context) at which point it is decoded to makes estimates of the information that is read.

Typical host devices include stand alone computer systems such as a desktop or laptop computer, enterprise storage devices such as servers, storage arrays such as a redundant array of independent disks (RAID) arrays, storage routers, storage switches and storage directors, and other consumer devices such as video game systems and digital video recorders. These devices provide high storage capacity in a cost effective manner.

Within such HDDs, there are generally a large number of various processing modules therein that need to operate in concert with one another to ensure appropriate formatting of data going to and from the storage media of the HDD.

Some prior art approaches employ a complex sequencer to perform these functions. For example, to try to achieve some degree of flexibility and control into the formatting system, it is usually required that a complex sequencer be used to effectuate all of the appropriate operations of the various modules within the formatting system. Such a system includes a relatively complex instruction set with a substantial writable control store and a mechanism that allows it to branch and possibly perform nested looping. Additionally, such a system requires its own independent firmware development (which can be costly and introduce significant delays into the design process). Moreover, this prior art approach is inherently inflexible, in that, a dedicated sequencer is employed for a particular application. If the operations or needs of the system change, then an entire re-doing/re-designing of this relatively highly complex sequencer must be performed.

BRIEF SUMMARY OF THE INVENTION

The present invention is directed to apparatus and methods of operation that are further described in the following Brief Description of the Several Views of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWINGS

FIG. 12 and FIG. 13 illustrate embodiments of methods for generating format field elements (FFEs) for use in operating a hard disk drive (HDD).

DETAILED DESCRIPTION OF THE INVENTION

Figure 1:
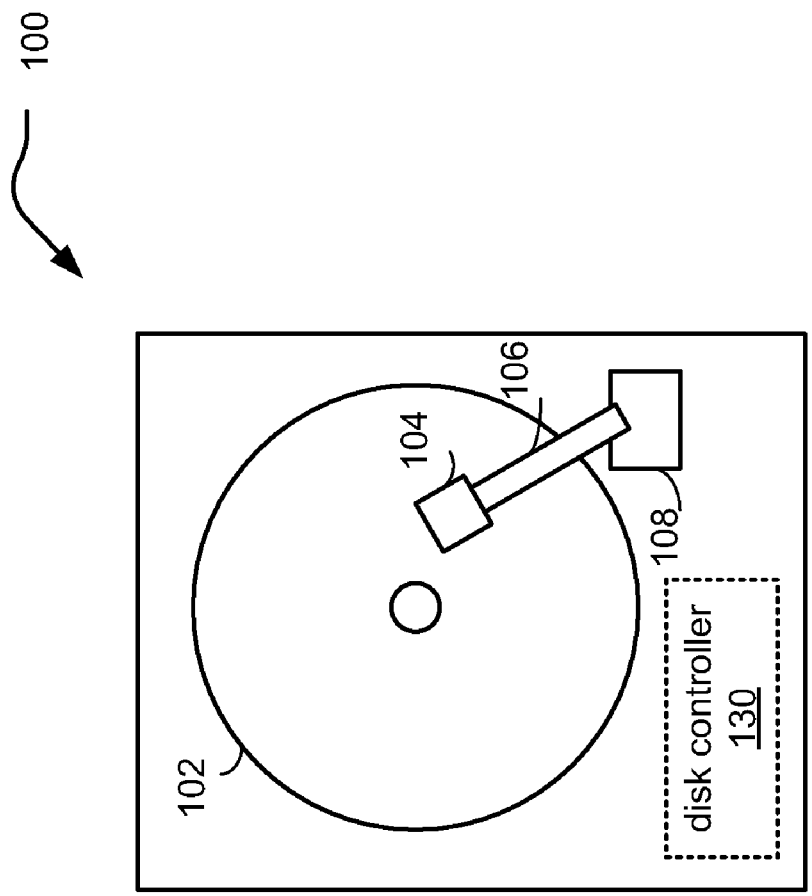
FIG. 1 illustrates an embodiment of a disk drive unit.

A novel means is presented herein by which modules within a data formatting system of a hard disk drive (HDD) can be configured to operate cooperatively with one another. This provides for formatting disk drive data prior to being transferred through the read/write channel to the disk (e.g., storage media of the HDD).

In accordance with this, data is formatted based on "format field elements" (FFEs), which can be viewed as multi-dimensional instructions which are employed by various data formatting modules within the data formatting system. These FFEs of the format are incremental repeatable instructions that perform a specific set of functions based on various op-codes within the instruction definition. These FFEs may be viewed as being instruction sets that are defined or based on external events and also have pre-defined links and relationships between them.

The length of the field is defined by a "field length" field within the format field element. A most fundamental definition of a FFE includes a "field length" field and some control op-codes/bits.

Some op-code functions may be included in the format field element definition which causes the "field length" field to be defined differently for these instructions. An example of such an op-code is a "wait on compare" instruction. In this case, the "field length" field would hold the compare value.

In one possible embodiment, FFEs are loaded into a FIFO buffer/memory by a processor (which can be a general purpose processor or a reduced instruction set computer (RISC) processor). In some embodiments, a DPE (Disk Protocol Engine) is implemented with a RISC processor, and this DPE is the processor which generates the FFEs and loads them into the FIFO buffers that are coupled to data formatting modules. The real-time processor access requirement is defined by the depth of the FIFO and the access rates of either side of the FIFO. A deep FIFO requires less "baby-sitting" by the processor than a shallow FIFO.

The read-side of the FIFO is accessed by a data formatting module (e.g., a simple sequencer, compared to the relatively highly complex sequencer sometimes employed in prior art approaches) that merely traverses through the format fields in chronological order, executing each FFE until the field length has been exhausted. This data formatting module (e.g., simple sequencer) requires function for advancing the FIFO, timing the field lengths, and producing outputs.

The processor function of directing the formatter through an assembly of FFEs requires that the firmware break the format up into the smallest elements of the format that are distinguishable from elements in adjacent clock cycles. Any format control op-code (or bit) change that is needed in adjacent clock cycles of the formatting requires an additional format field element.

Timing for the starting of blocks of a data format is accomplished using FFEs that wait on events. Intra-block timing is defined by the lengths of the format fields within the intra-block format. Various error checking functions can be performed between blocks of formatting so long as it doesn't interfere with the timing for the starting of a new block of formatting.

Prior to a formatting operation, the processor is responsible for loading the format field FIFO and starting the sequencer when an "end flag" is reached, the sequencer stops.

This novel approach is fully programmable from a single microprocessor that can also be implemented with the ability to perform additional tasks. No independent sequencer firmware development or support is required (in contrast to prior art approaches of using a relatively high complexity sequencer). The formatting function is very simple and easy to implement. Additionally it is easy to add new function and features given the processor based implementation thereof.

The novel means presented herein of employing a single processor (e.g., a single RISC processor) in a centralized manner is much more efficient that prior art systems which employ a distributed decision-making architecture. For example, in prior art systems, multiple devices operate in concert with one another to make decisions of configuring various data formatting modules within a HDD, and in such an embodiment that includes multiple devices, they all need to communicate with one another and then converge on one solution. The greater the number of devices, the more difficult it can be for them all to communicate with one another and converge on such a solution. For example, various tie-breaking schemes typically need to be designed into such a prior art architecture to govern which configuration 'wins' in the event of multiple devices ending up in a 'tie' when vying for the control.

In contrast, the novel means of employing a centralized processing module (e.g., a RISC processor) to drive all of the various data formatting modules within the HDD obviates all of the prior art architecture's requirement of communication between the various devices, tie-breaking schemes, etc. that are inherent to a distributed decision-making architecture. As long as the various data formatting modules within the HDD have sufficient input/output capability, then the centralized processing module (e.g., a RISC processor) can configure each of the various data formatting modules. The firmware within this centralized processing module (e.g., a RISC processor) can be adapted and modified to perform new and/or different tasks and to configure the various data formatting modules differently within different applications. Compared to the need to re-provision hardware a prior art architecture, the novel means of employing a centralized processing module (e.g., a RISC processor) to configure the various data formatting modules allows for great flexibility and adaptation as application requirements, needs, and/or desires change.

Unlike a prior art approach that employs a distributed decision-making architecture (e.g., using complex sequencers), the novel means of employing a centralized processing module (e.g., a RISC processor) performs all of the disk formatting operations within a main processor. Because the centralized processing module (e.g., a RISC processor) is the ultimate decision-maker, it can be programmed up to perform an entire data transfer.

In addition, the novel means of employing a centralized processing module (e.g., a RISC processor) allows total flexibility in dealing with different sectors to be provided to or read from the storage media of the HDD.

The use of FFEs, to configure multiple modules within a system, can also be extended to other sub-systems of a HDD (e.g., a servo formatting system).

FIG. 1 illustrates an embodiment of a disk drive unit 100. In particular, disk drive unit 100 includes a disk 102 that is rotated by a servo motor (not specifically shown) at a velocity such as 3600 revolutions per minute (RPM), 4200 RPM, 4800 RPM, 5,400 RPM, 7,200 RPM, 10,000 RPM, 15,000 RPM; however, other velocities including greater or lesser velocities may likewise be used, depending on the particular application and implementation in a host device. In one possible embodiment, disk 102 can be a magnetic disk that stores information as magnetic field changes on some type of magnetic medium. The medium can be a rigid or non-rigid, removable or non-removable, that consists of or is coated with magnetic material.

Disk drive unit 100 further includes one or more read/write heads 104 that are coupled to arm 106 that is moved by actuator 108 over the surface of the disk 102 either by translation, rotation or both. A disk controller 130 is included for controlling the read and write operations to and from the drive, for controlling the speed of the servo motor and the motion of actuator 108, and for providing an interface to and from the host device.

Figure 2:
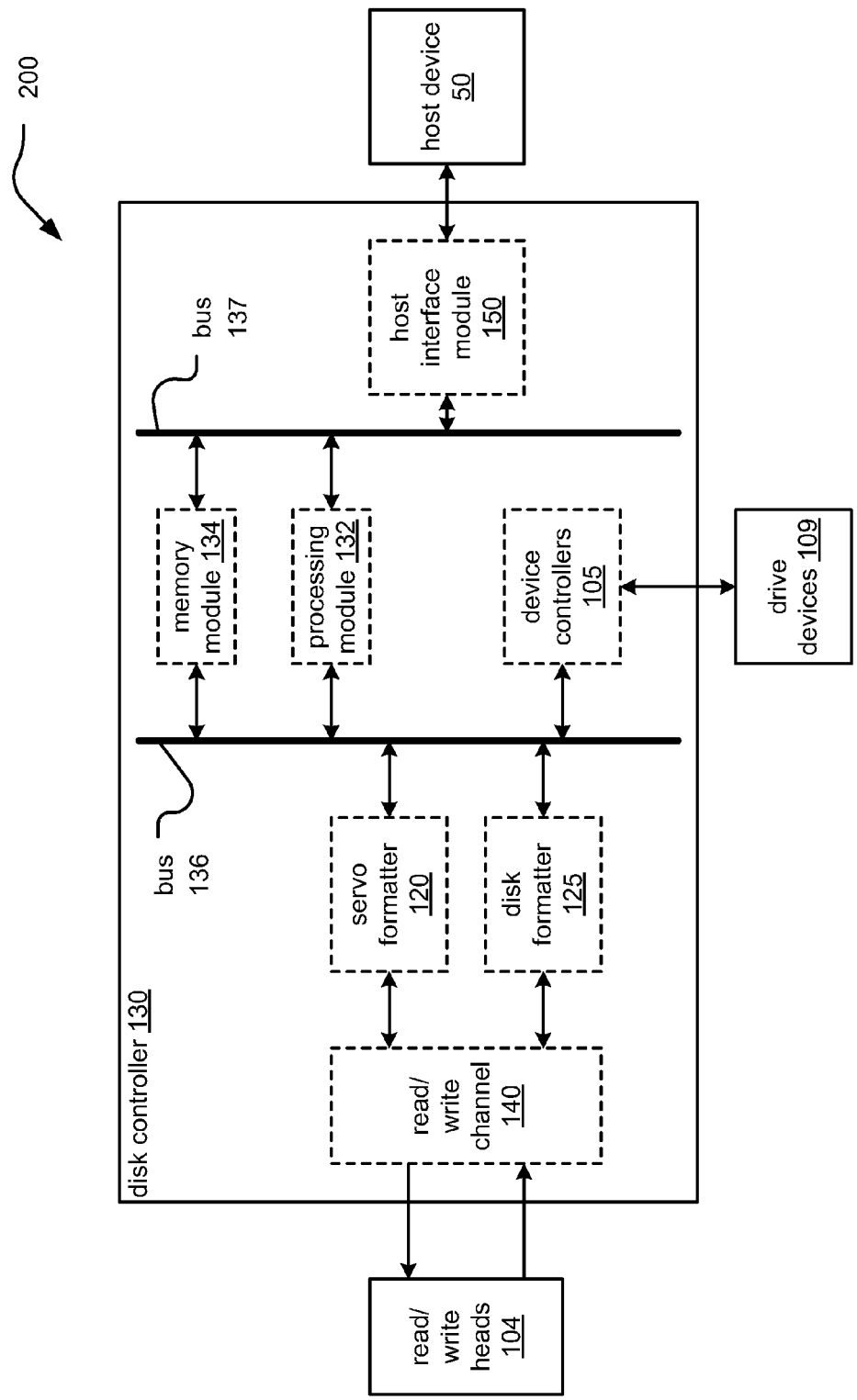
FIG. 2 illustrates an embodiment of an apparatus that includes a disk controller.

FIG. 2 illustrates an embodiment of an apparatus 200 that includes a disk controller 130. In particular, disk controller 130 includes a read/write channel 140 for reading and writing data to and from disk 102 through read/write heads 104. Disk formatter 125 is included for controlling the formatting of data and provides clock signals and other timing signals that control the flow of the data written to, and data read from disk 102. Servo formatter 120 provides clock signals and other timing signals based on servo control data read from disk 102. Device controllers 105 control the operation of drive devices 109 such as actuator 108 and the servo motor, etc. Host interface 150 receives read and write commands from host device 50 and transmits data read from disk 102 along with other control information in accordance with a host interface protocol. In one embodiment, the host interface protocol can include, SCSI, SATA, enhanced integrated drive electronics (EIDE), or any number of other host interface protocols, either open or proprietary that can be used for this purpose.

Disk controller 130 further includes a processing module 132 and memory module 134. Processing module 132 can be implemented using one or more microprocessors, micro-controllers, digital signal processors, microcomputers, central processing units, field programmable gate arrays, programmable logic devices, state machines, logic circuits, analog circuits, digital circuits, and/or any devices that manipulates signal (analog and/or digital) based on operational instructions that are stored in memory module 134. When processing module 132 is implemented with two or more devices, each device can perform the same steps, processes or functions in order to provide fault tolerance or redundancy. Alternatively, the function, steps and processes performed by processing module 132 can be split between different devices to provide greater computational speed and/or efficiency.

Memory module 134 may be a single memory device or a plurality of memory devices. Such a memory device may be a read-only memory, random access memory, volatile memory, non-volatile memory, static random access memory (SRAM), dynamic random access memory (DRAM), flash memory, cache memory, and/or any device that stores digital information. Note that when the processing module 132 implements one or more of its functions via a state machine, analog circuitry, digital circuitry, and/or logic circuitry, the memory module 134 storing the corresponding operational instructions may be embedded within, or external to, the circuitry comprising the state machine, analog circuitry, digital circuitry, and/or logic circuitry. Further note that, the memory module 134 stores, and the processing module 132 executes, operational instructions that can correspond to one or more of the steps or a process, method and/or function illustrated herein.

Disk controller 130 includes a plurality of modules, in particular, device controllers 105, processing module 132, memory module 134, read/write channel 140, disk formatter 125, and servo formatter 120 that are interconnected via bus 136 and bus 137. The host interface 150 can be connected to only the bus 137 and communicates with the host device 50. Each of these modules can be implemented in hardware, firmware, software or a combination thereof, in accordance with the broad scope of the present invention. While a particular bus architecture is shown in FIG. 2 with buses 136 and 137, alternative bus architectures that include either a single bus configuration or additional data buses, further connectivity, such as direct connectivity between the various modules, are likewise possible to implement the features and functions included in various embodiments.

In one possible embodiment, one or more modules of disk controller 130 are implemented as part of a system on a chip (SoC) integrated circuit. In an embodiment, this SoC integrated circuit includes a digital portion that can include additional modules such as protocol converters, linear block code encoding and decoding modules, etc., and an analog portion that includes device controllers 105 and optionally additional modules, such as a power supply, etc. In a further embodiment, the various functions and features of disk controller 130 are implemented in a plurality of integrated circuit devices that communicate and combine to perform the functionality of disk controller 130.

When the drive unit 100 is manufactured, disk formatter 125 writes a plurality of servo wedges along with a corresponding plurality of servo address marks at equal radial distance along the disk 102. The servo address marks are used by the timing generator for triggering the "start time" for various events employed when accessing the media of the disk 102 through read/write heads 104.

Figure 3:
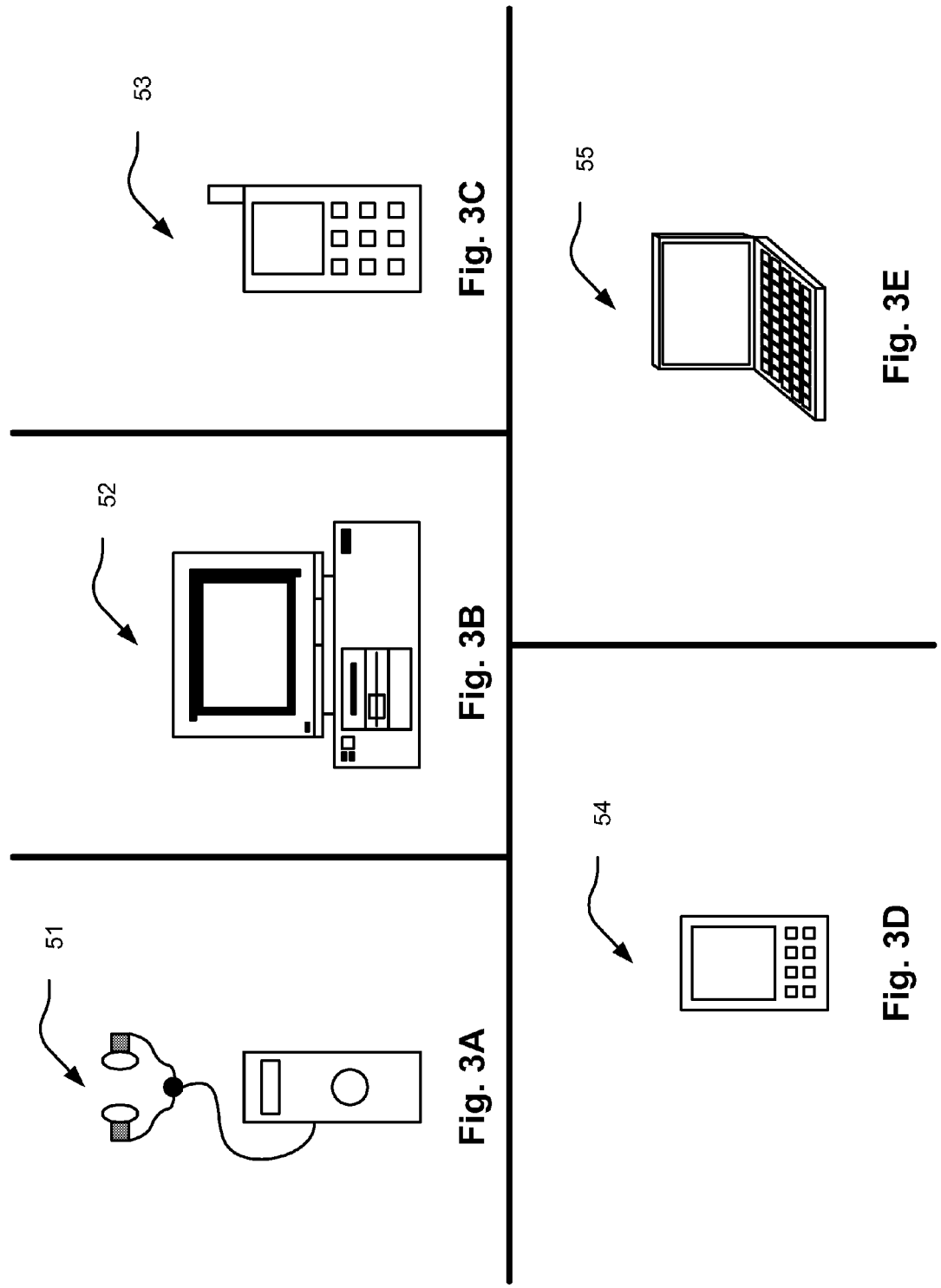
FIG. 3A illustrates an embodiment of a handheld audio unit.
FIG. 3B illustrates an embodiment of a computer.
FIG. 3C illustrates an embodiment of a wireless communication device.
FIG. 3D illustrates an embodiment of a personal digital assistant (PDA).
FIG. 3E illustrates an embodiment of a laptop computer.

FIG. 3A illustrates an embodiment of a handheld audio unit 51. In particular, disk drive unit 100 can be implemented in the handheld audio unit 51. In one possible embodiment, the disk drive unit 100 can include a small form factor magnetic hard disk whose disk 102 has a diameter 1.8" or smaller that is incorporated into or otherwise used by handheld audio unit 51 to provide general storage or storage of audio content such as motion picture expert group (MPEG) audio layer 3 (MP3) files or Windows Media Architecture (WMA) files, video content such as MPEG4 files for playback to a user, and/or any other type of information that may be stored in a digital format.

FIG. 3B illustrates an embodiment of a computer 52. In particular, disk drive unit 100 can be implemented in the computer 52. In one possible embodiment, disk drive unit 100 can include a small form factor magnetic hard disk whose disk 102 has a diameter 1.8" or smaller, a 2.5" or 3.5" drive or larger drive for applications such as enterprise storage applications. Disk drive 100 is incorporated into or otherwise used by computer 52 to provide general purpose storage for any type of information in digital format. Computer 52 can be a desktop computer, or an enterprise storage devices such a server, of a host computer that is attached to a storage array such as a redundant array of independent disks (RAID) array, storage router, edge router, storage switch and/or storage director.

FIG. 3C illustrates an embodiment of a wireless communication device 53. In particular, disk drive unit 100 can be implemented in the wireless communication device 53. In one possible embodiment, disk drive unit 100 can include a small form factor magnetic hard disk whose disk 102 has a diameter 1.8" or smaller that is incorporated into or otherwise used by wireless communication device 53 to provide general storage or storage of audio content such as motion picture expert group (MPEG) audio layer 3 (MP3) files or Windows Media Architecture (WMA) files, video content such as MPEG4 files, JPEG (joint photographic expert group) files, bitmap files and files stored in other graphics formats that may be captured by an integrated camera or downloaded to the wireless communication device 53, emails, webpage information and other information downloaded from the Internet, address book information, and/or any other type of information that may be stored in a digital format.

In a possible embodiment, wireless communication device 53 is capable of communicating via a wireless telephone network such as a cellular, personal communications service (PCS), general packet radio service (GPRS), global system for mobile communications (GSM), and integrated digital enhanced network (iDEN) or other wireless communications network capable of sending and receiving telephone calls. Further, wireless communication device 53 is capable of communicating via the Internet to access email, download content, access websites, and provide steaming audio and/or video programming. In this fashion, wireless communication device 53 can place and receive telephone calls, text messages such as emails, short message service (SMS) messages, pages and other data messages that can include attachments such as documents, audio files, video files, images and other graphics.

FIG. 3D illustrates an embodiment of a personal digital assistant (PDA) 54. In particular, disk drive unit 100 can be implemented in the personal digital assistant (PDA) 54. In one possible embodiment, disk drive unit 100 can include a small form factor magnetic hard disk whose disk 102 has a diameter 1.8" or smaller that is incorporated into or otherwise used by personal digital assistant 54 to provide general storage or storage of audio content such as motion picture expert group (MPEG) audio layer 3 (MP3) files or Windows Media Architecture (WMA) files, video content such as MPEG4 files, JPEG (joint photographic expert group) files, bitmap files and files stored in other graphics formats, emails, webpage information and other information downloaded from the Internet, address book information, and/or any other type of information that may be stored in a digital format.

FIG. 3E illustrates an embodiment of a laptop computer 55. In particular, disk drive unit 100 can be implemented in the laptop computer 55. In one possible embodiment, disk drive unit 100 can include a small form factor magnetic hard disk whose disk 102 has a diameter 1.8" or smaller, or a 2.5" drive. Disk drive 100 is incorporated into or otherwise used by laptop computer 52 to provide general purpose storage for any type of information in digital format.

Figure 4:
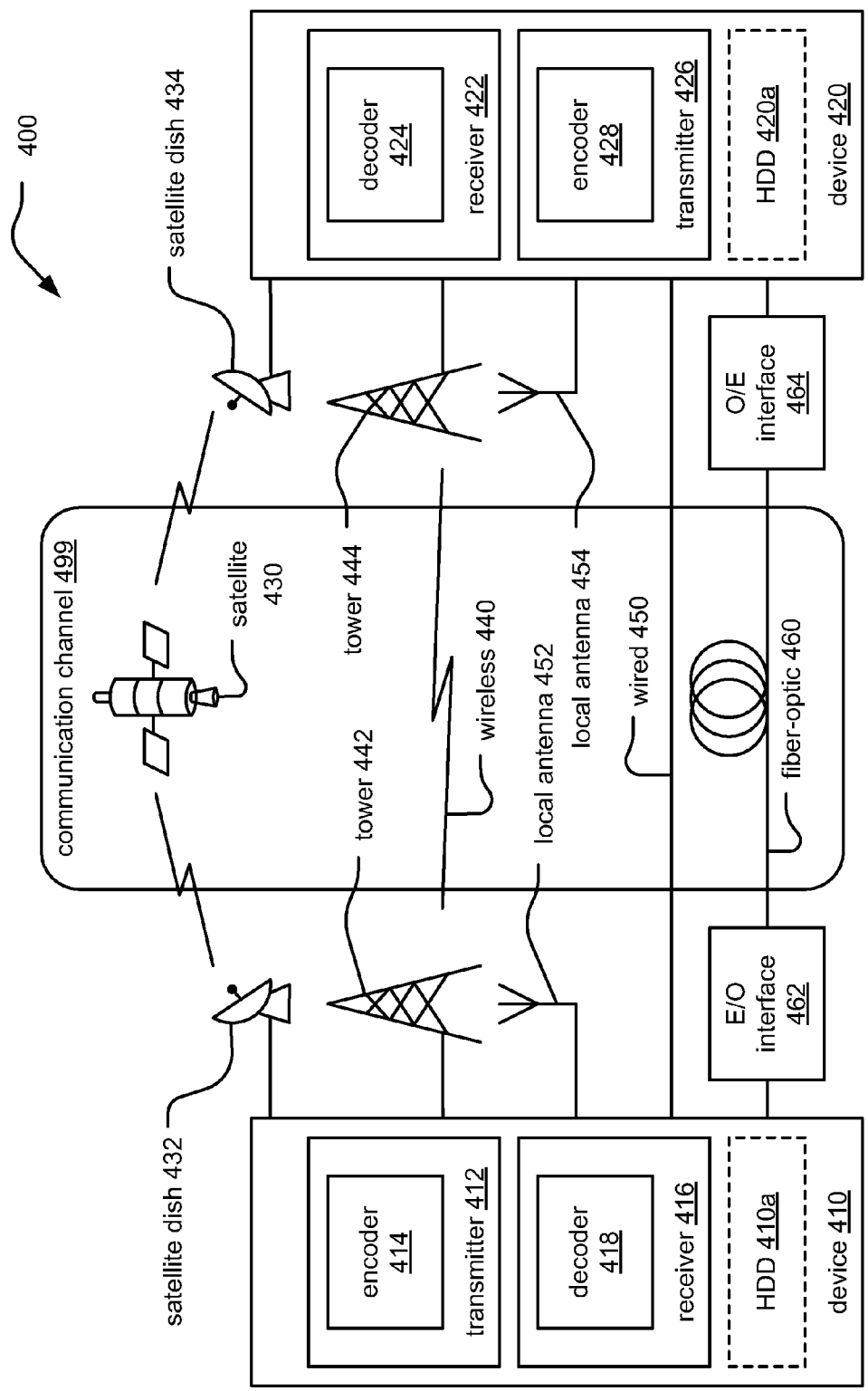
FIG. 4 illustrates an embodiment of a communication system.

FIG. 4 is a diagram illustrating an embodiment of a communication system 400.

Referring to FIG. 4, this embodiment of a communication system 400 is a communication channel 499 that communicatively couples a communication device 410 (including a transmitter 412 having an encoder 414 and including a receiver 416 having a decoder 418) situated at one end of the communication channel 499 to another communication device 420 (including a transmitter 426 having an encoder 428 and including a receiver 422 having a decoder 424) at the other end of the communication channel 499. In some embodiments, either of the communication devices 410 and 420 may only include a transmitter or a receiver. There are several different types of media by which the communication channel 499 may be implemented (e.g., a satellite communication channel 430 using satellite dishes 432 and 434, a wireless communication channel 440 using towers 442 and 444 and/or local antennae 452 and 454, a wired communication channel 450, and/or a fiber-optic communication channel 460 using electrical to optical (E/O) interface 462 and optical to electrical (O/E) interface 464)). In addition, more than one type of media may be implemented and interfaced together thereby forming the communication channel 499.

Either one of both of the communication device 410 and the communication device 420 can include a hard disk drive (HDD) (or be coupled to a HDD). For example, the communication device 410 can include a HDD 410a, and the communication device 420 can include a HDD 420a.

The signals employed within this embodiment of a communication system 400 can be Reed-Solomon (RS) coded signals, LDPC (Low Density Parity Check) coded signal, turbo coded signals, turbo trellis coded modulation (TTCM), or coded signal generated using some other error correction code (ECC).

Any of a very wide variety of applications that perform transferring of data from one location to another (e.g., including from a first location to a HDD, or from the HDD to another location) can benefit from various aspects of the invention, including any of those types of communication devices and/or communication systems depicted in FIG. 4. Moreover, in accordance with those communication devices that include an HDD, the use format field elements (FFEs) can be employed therein to assist in the overall operation of the communication device.

Figure 5:
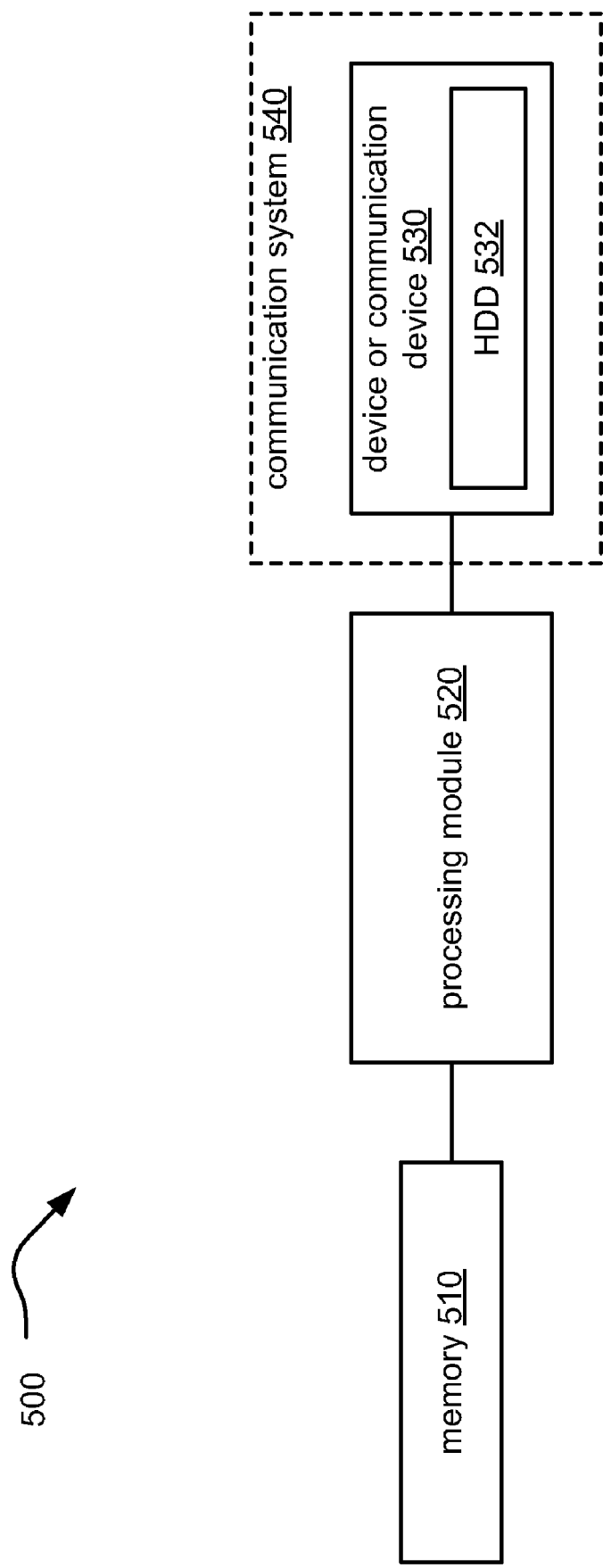
FIG. 5 illustrates an embodiment of an apparatus that is operable to format field elements (FFEs) in accordance with encoding and decoding of signals within and between various communication devices.

FIG. 5 illustrates an embodiment of an apparatus 500 that is operable to employ one or more cyclic redundancy checks (FFEs) in accordance with encoding and decoding of signals within and between various communication devices. The apparatus 500 includes a processing module 520, and a memory 510. The memory 510 is coupled to the processing module, and the memory 510 is operable to store operational instructions that enable the processing module 520 to perform a variety of functions. The processing module 520 is operable to perform the appropriate generating and/or processing of one or more FFEs using any of the approaches presented herein.

The processing module 520 can be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 510 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 520 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

If desired in some embodiments, the means of generating and/or processing of one or more FFEs can be provided from the apparatus 500 to a communication system 540 that is operable to employ and perform processing in accordance with such FFEs. The means of generating and/or processing of one or more FFEs can also be provided from the apparatus 500 to any of a variety of devices or communication devices 530 implemented within the communication system 540 as well. The device or communication device 530 can include a HDD 532 in certain embodiments. This way, a completely integrated means is provided by which the means of generating and/or processing of one or more FFEs implemented as part of a device or communication device that employs such FFEs.

If desired, the apparatus 520 can be designed to generate multiple means of generating and/or processing of one or more FFEs corresponding to multiple needs and/or desires as well. In some embodiments, the apparatus 520 can selectively provide different information (corresponding to different means of FFE processing) to different communication devices and/or communication systems. That way, different communication links between different communication devices can employ different FFEs. Clearly, the apparatus 520 can also provide the same information (corresponding to a singular the means of generating and/or processing of one or more FFEs) to each of different communication devices and/or communication systems as well without departing from the scope and spirit of the invention.

Figure 6:
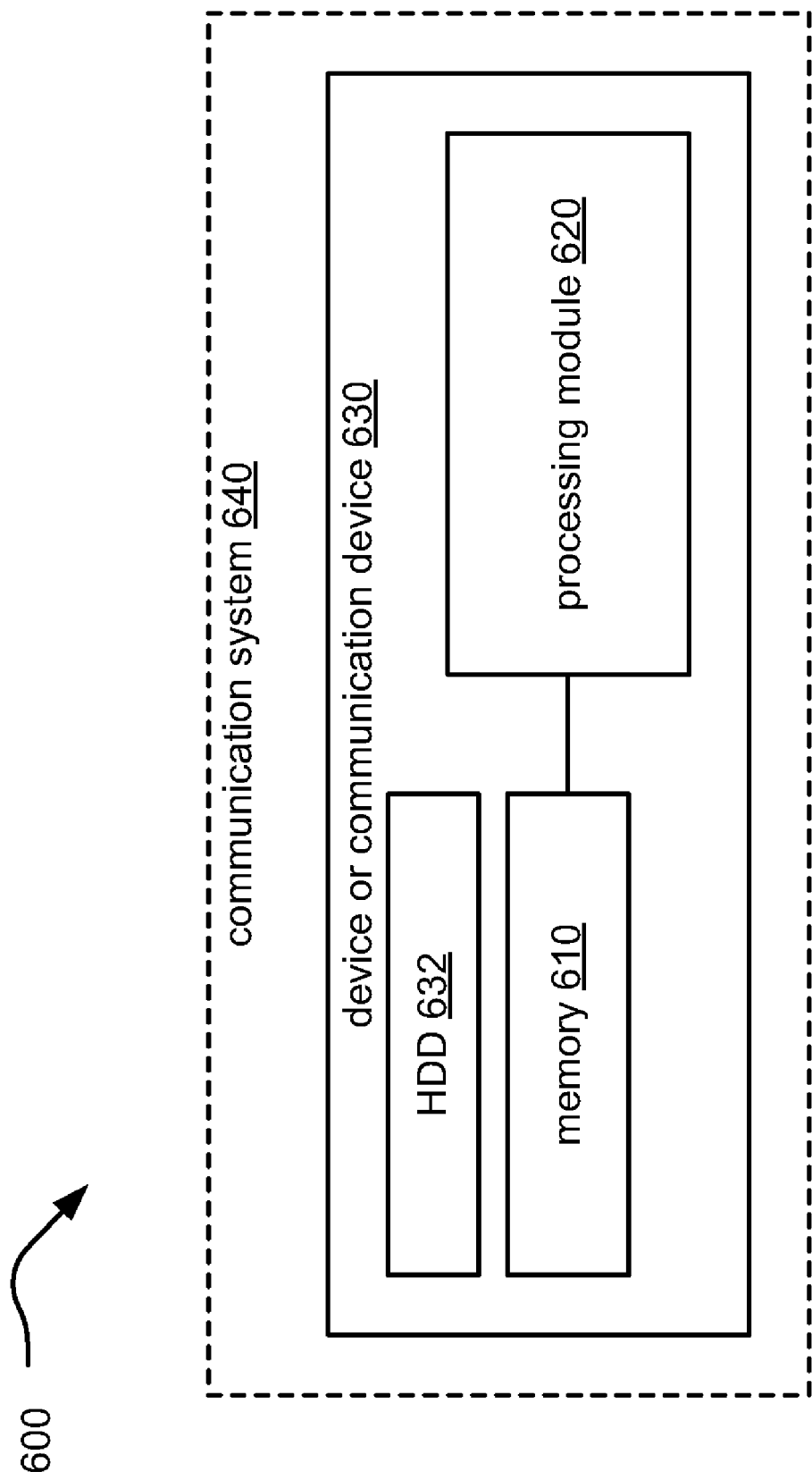
FIG. 6 illustrates an alternative embodiment of an apparatus that is operable to employ one or more FFEs in accordance with encoding and decoding of signals within and between various communication devices.

FIG. 6 illustrates an alternative embodiment of an apparatus 600 that is operable to employ one or more FFEs in accordance with encoding and decoding of signals within and between various communication devices. The apparatus 600 includes a processing module 620, and a memory 610. The memory 610 is coupled to the processing module, and the memory 610 is operable to store operational instructions that enable the processing module 620 to perform a variety of functions. The processing module 620 (serviced by the memory 610) can be implemented as an apparatus capable to perform any of the functionality of any of the various modules and/or functional blocks described herein. For example, the processing module 620 (serviced by the memory 620) can be implemented as an apparatus capable to perform generating and/or processing of one or more FFEs using any of the various embodiments described herein.

The processing module 620 can be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 610 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 620 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

If desired in some embodiments, the apparatus 600 can be any of a variety of devices, or any part or portion of any such device or communication device. The device or communication device 630 can include a HDD 632 in certain embodiments. Any such communication device that includes the apparatus 600 can be implemented within any of a variety of communication systems 640 as well. It is also noted that various embodiments of means of generating and/or processing of one or more FFEs presented herein, and equivalents thereof, may be applied to many types of communication systems and/or communication devices.

Figure 7:
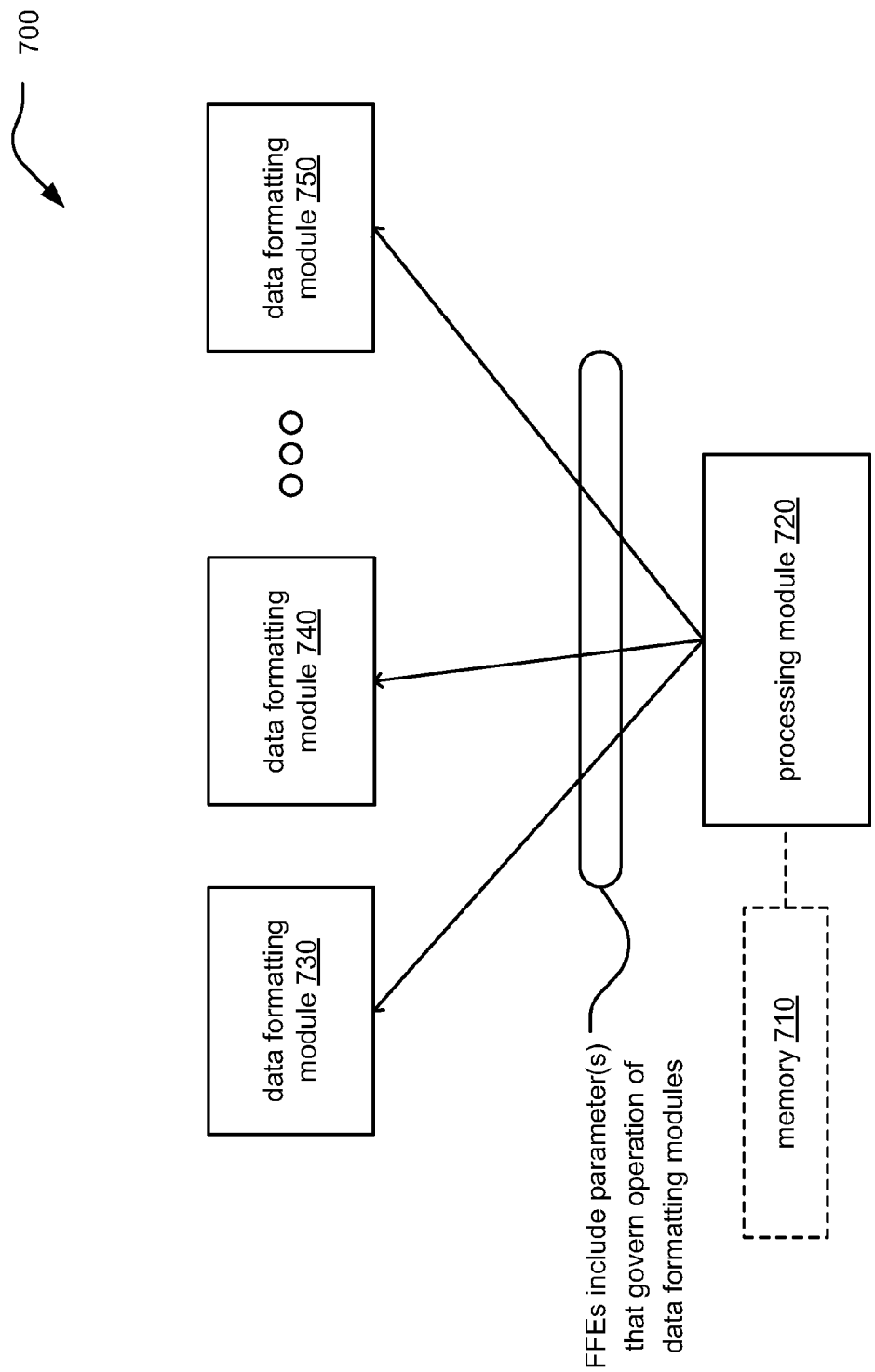
FIG. 7 illustrates an embodiment of a processing module providing FFEs to multiple data formatting modules.

FIG. 7 illustrates an embodiment 700 of a processing module providing FFEs to multiple data formatting modules. A single processing module 720, which can be a general purpose processor or reduced instruction set computer (RISC) processor, provides FFEs to each of a plurality of data formatting modules (e.g., data formatting module 730, 740, . . . , and 750) within a data formatting system of a HDD. The processing module 720 can include an integrated memory or an external memory 710 coupled thereto.

Each FFE includes one or more parameters that governs the operation of each of its corresponding data formatting module. This embodiment shows how the FFEs are provided directly to the appropriate data formatting module from the processing module 720.

The determination of when a particular data formatting module changes from being configured in accordance with a first FFE to a second FFE can be based on any number of parameters including: a predetermined of time being elapsed, a predetermined set of operations being performed, a condition being met (e.g., such as a particular signal within the system changing from low to high or vice versa), completion of a particular task, etc.

The FFE can be implemented to have a particular filed (e.g., an opcode) that indicates the means by which the transference of configuration is made from a first FFE to a second FFE for a particular data formatting module. Moreover, even for a particular data formatting module, the transference of configuration from a first FFE to a second FFE may be made based on a first situation (e.g., a period of time being elapsed), and the transference of configuration from the second FFE to a third FFE may be made based on a second situation (e.g., a condition being met). In other words, for a particular data formatting module, it may be configured in accordance with a first FFE during a first time, and then configured in accordance with a second FFE during a second time. An opcode within the first FFE can specify a first condition which transfers the configuration of the corresponding data formatting module to be governed by a second FFE. However, an opcode within the second FFE can specify a second condition (different from the first condition) which transfers the configuration of the corresponding data formatting module to be governed by a third FFE.

Figure 8:
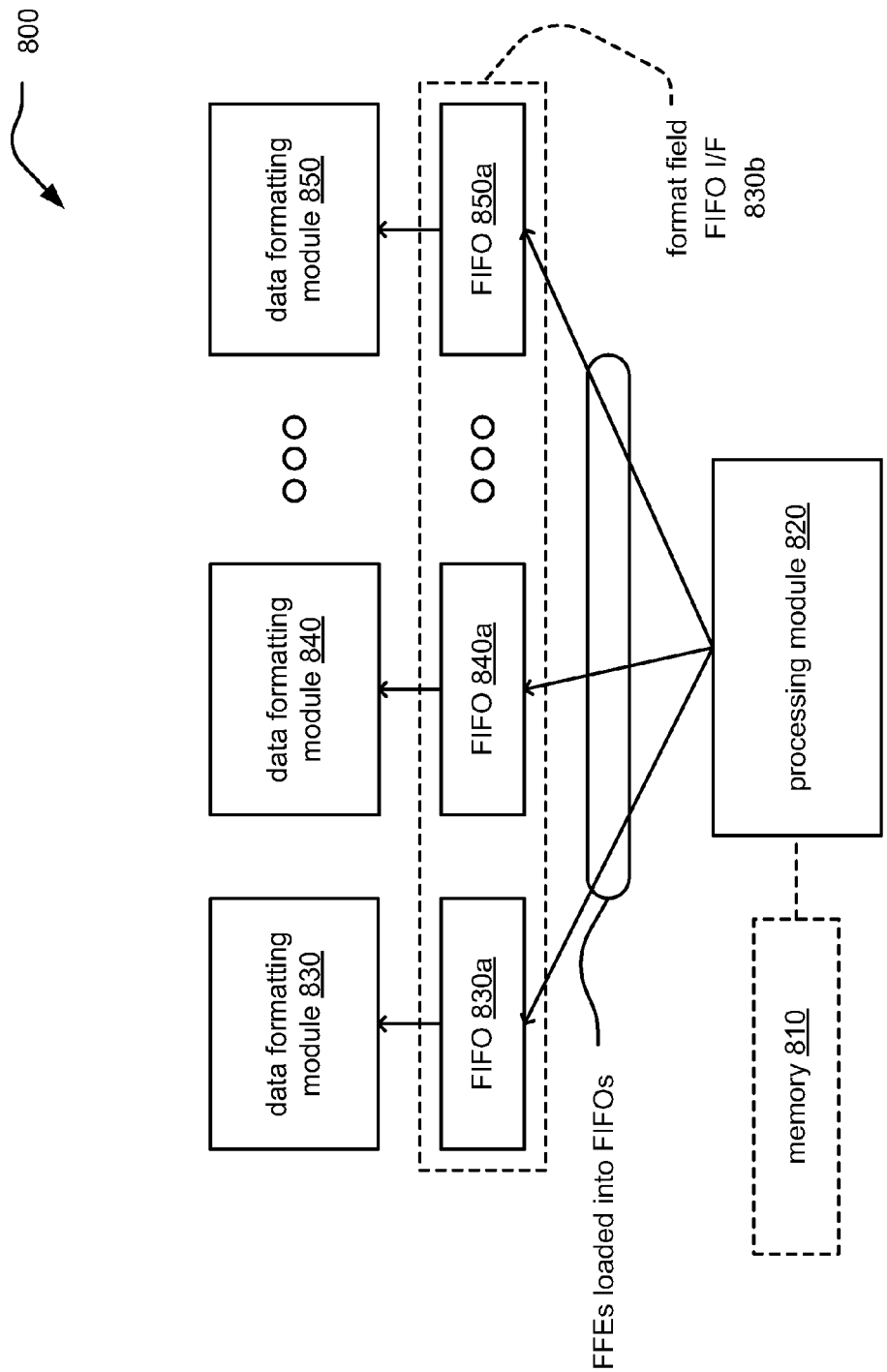
FIG. 8 illustrates an embodiment of a processing module providing FFEs to FIFO buffers coupled to multiple data formatting modules.

FIG. 8 illustrates an embodiment 800 of a processing module providing FFEs to FIFO buffers coupled to multiple data formatting modules. A single processing module 820, which can be a general purpose processor or RISC processor, provides FFEs to each of a plurality of FIFO buffers such that each FIFO buffer is coupled to a corresponding data formatting module. The processing module 820 can include an integrated memory or an external memory 810 coupled thereto.

For example, FIFO buffer 830*a* is coupled to data formatting module 830. FIFO buffer 830*a* receives the FFEs from the processing module 820 for configuring the data formatting module 830. FIFO buffer 840*a* receives the FFEs from the processing module 820 for configuring the data formatting module 840. FIFO buffer 850*a* receives the FFEs from the processing module 820 for configuring the data formatting module 850.

The FIFO buffers 830*a*, 840*a*, and 850*a* can all corporately be considered to be a format field FIFO interface 830*b*.

Each FFE includes one or more parameters that governs the operation of each of its corresponding data formatting module. This embodiment shows how the FFEs are provided to FIFO buffers firstly, and the FFEs are then pulled from a corresponding FIFO buffer to govern the operation of the data formatting module coupled to that FIFO buffer.

Figure 9:
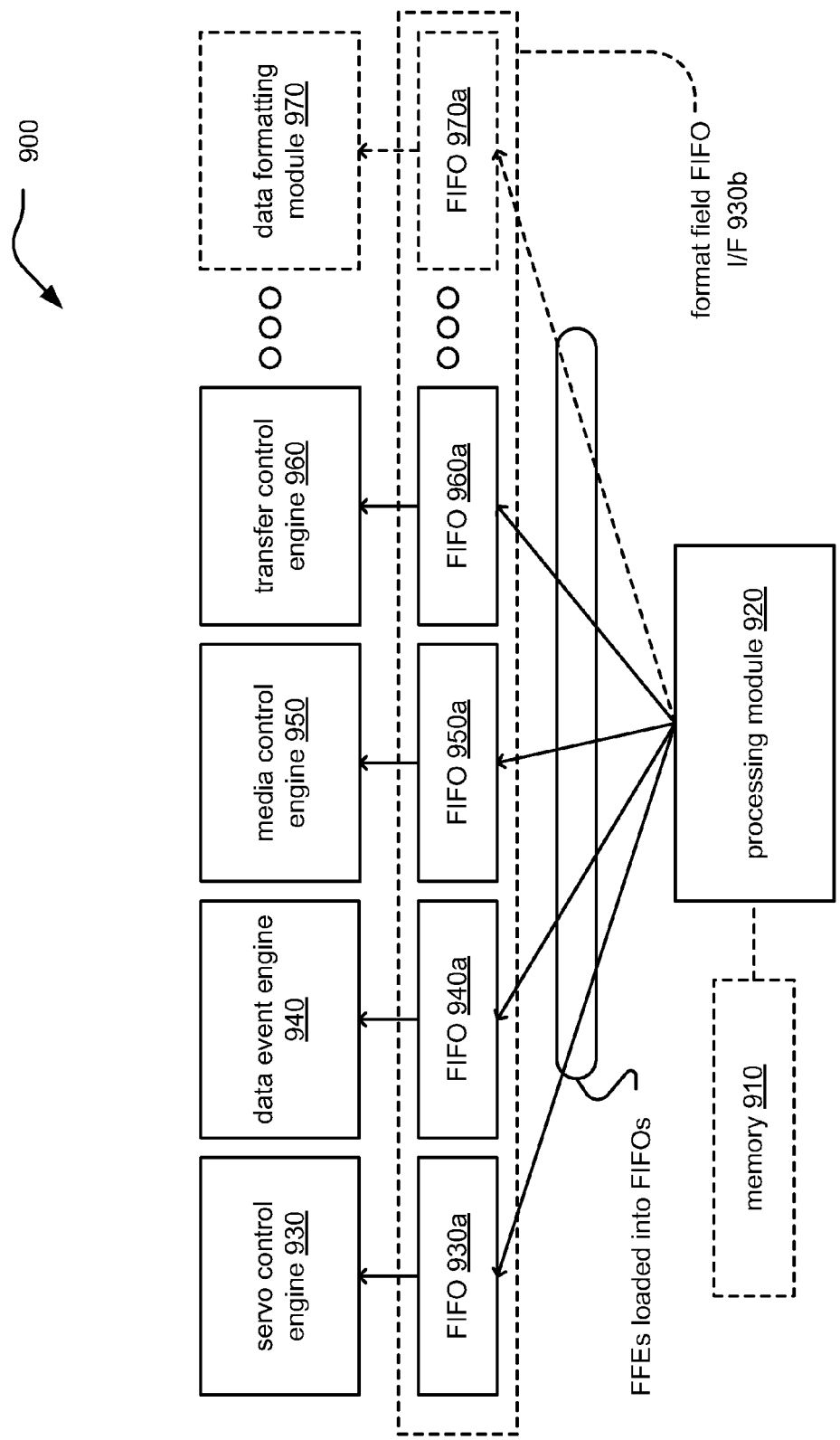
FIG. 9 illustrates an alternative embodiment of a processing module providing FFEs to FIFO buffers coupled to multiple data formatting modules.

FIG. 9 illustrates an alternative embodiment 900 of a processing module providing FFEs to FIFO buffers coupled to multiple data formatting modules. This diagram shows some specific examples of types of data formatting modules that can be employed within a HDD.

A single processing module 920, which can be a general purpose processor or RISC processor, provides FFEs to each of a plurality of FIFO buffers such that each FIFO buffer is coupled to a corresponding data formatting module. The processing module 920 can include an integrated memory or an external memory 910 coupled thereto.

FIFO buffer 930*a* is coupled to a servo control engine 930. FIFO buffer 930*a* receives the FFEs from the processing module 920 for configuring the servo control engine 930. Among other operations, the servo control engine 930 is operable to determine when a SAM (Servo Address Mark) has been found. Also, the servo control engine 930 provides a servo gate signal for use within the HDD system.

FIFO buffer 940*a* is coupled to a data event engine 940. FIFO buffer 940*a* receives the FFEs from the processing module 920 for configuring the data event engine 940. Among other operations, the data event engine 940 provides an early read gate signal and an early write gate signal for use within the HDD system. The data event engine 940 and the servo control engine 930 operate cooperatively to perform timing operations within the HDD.

FIFO buffer 950*a* is coupled to a media control engine 950. FIFO buffer 950*a* receives the FFEs from the processing module 920 for configuring media control engine 950. Among other operations, the media control engine 950 provides a read gate signal and a write gate signal for use within the HDD system.

FIFO buffer 960*a* is coupled to a transfer control engine 960. FIFO buffer 960*a* receives the FFEs from the processing module 920 for configuring transfer control engine 960. Among other operations, the transfer control engine 960 provides transfer enable signal for use within the HDD system.

In this embodiment (as within other embodiments), the processing module 920 generates the FFEs that are loaded into the FIFO buffers, and the processing module 920 can be a general purpose processor or a RISC processor. In some embodiments, a DPE (Disk Protocol Engine) is implemented with a RISC processor, and this DPE is the processor which generates the FFEs and loads them into the FIFO buffers that are coupled to the various data formatting modules.

Figure 10:
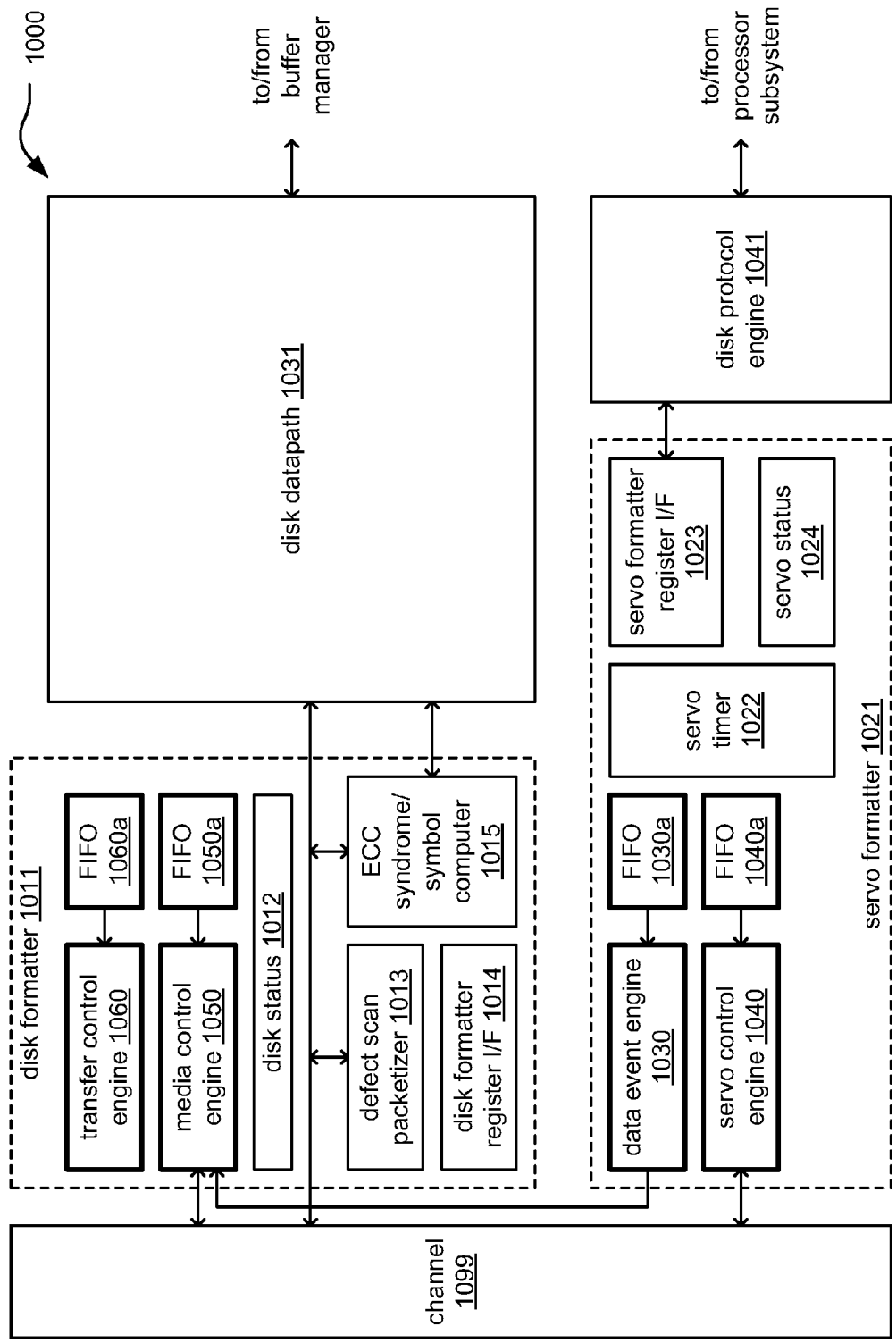
FIG. 10 illustrates an embodiment of a disk manager module.

FIG. 10 illustrates an embodiment of a disk manager module 1000. The disk manager module 1000 includes a disk datapath module 1031, a disk formatter module 1011, a servo formatter module 1021, and a disk protocol engine 1041 (which may be viewed as being a processing module that generates and supplies FFEs to various data formatting modules).

The disk formatter 1011 includes a transfer control engine 1060 that receives FFEs from a FIFO buffer 1060*a* coupled thereto. The disk protocol engine 1041 loads up the FIFO buffer 1060*a* with FFEs to govern the operation of the transfer control engine 1060.

The disk formatter 1011 includes a media control engine 1050 that receives FFEs from a FIFO buffer 1050*a* coupled thereto. The disk protocol engine 1041 loads up the FIFO buffer 1050*a* with FFEs to govern the operation of the media control engine 1050.

It is also noted that the disk formatter 1011 also includes a disk status module 1012, a defect scan packetizer 1013, a disk formatter register interface 1014 which allows interfacing with a channel 1099 of the HDD, an error correction code (ECC) syndrome/symbol computer 1015. The disk formatter 1011 couples to the disk datapath module 1031 which in turn couples to/from a buffer manager on a host side of the HDD.

The servo formatter 1021 includes a data event engine 1030 that receives FFEs from a FIFO buffer 1030*a* coupled thereto. The disk protocol engine 1041 loads up the FIFO buffer 1030*a* with FFEs to govern the operation of the data event engine 1030.

The servo formatter 1021 also includes a servo control engine 1040 that receives FFEs from a FIFO buffer 1040*a* coupled thereto. The disk protocol engine 1041 loads up the FIFO buffer 1040*a* with FFEs to govern the operation of the servo control engine 1040.

It is also noted that the servo formatter 1021 also includes a servo timer 1022, a servo status module 1024, and a servo formatter register interface 1023 which allows interfacing with the disk protocol engine 1041, which in turn interfaces to/from a processor subsystem of the HDD.

Figure 11:
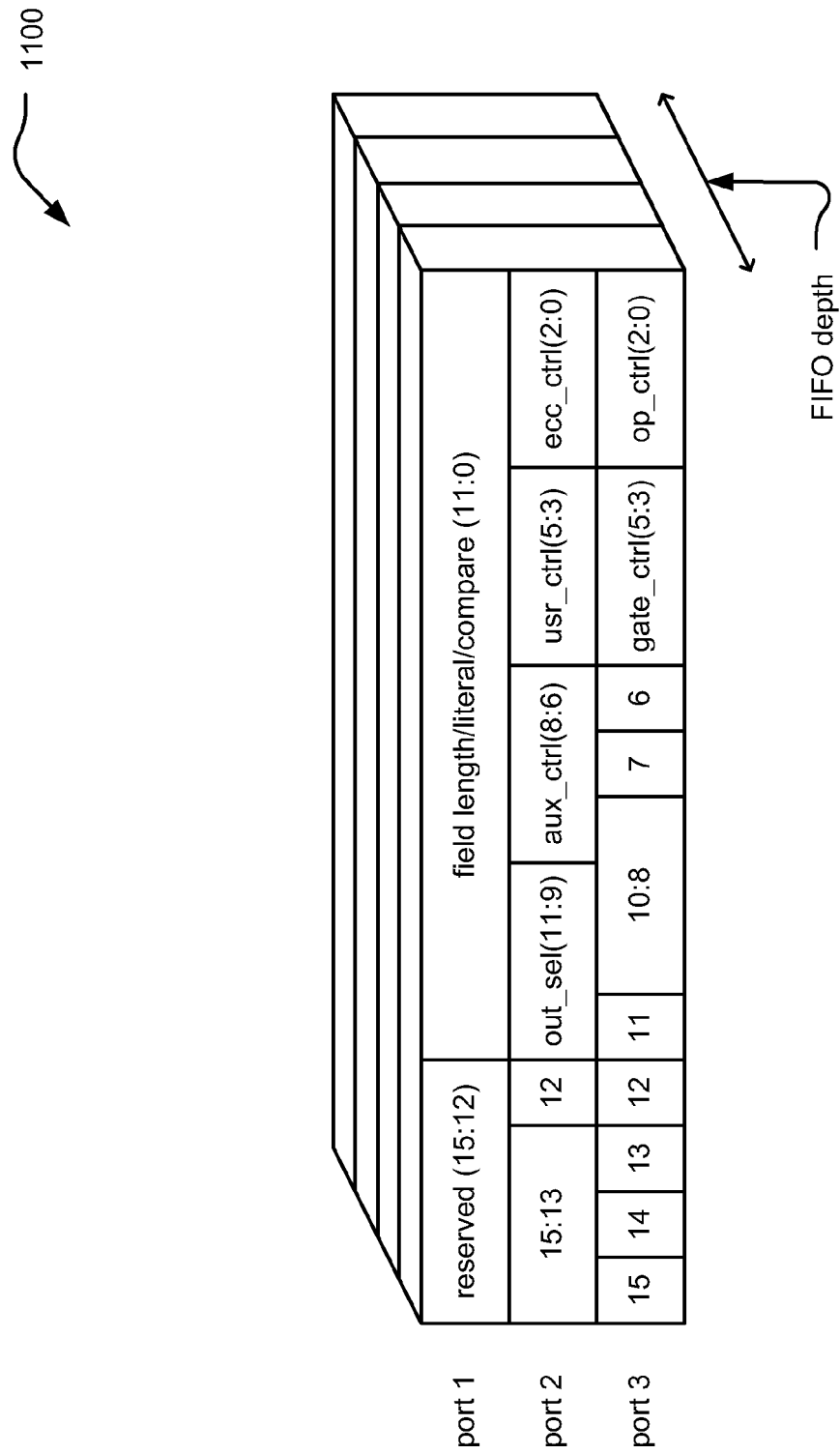
FIG. 11 illustrates an embodiment of a number of FFEs in queue.

FIG. 11 illustrates an embodiment of a number of FFEs 1100 in queue. This diagram shows how a format field FIFO may be queued to feed FFEs to any of the various data formatting modules (e.g., such as to a media control engine and a transfer control engine during a disk formatter operation).

Due to the real-time nature of feeding the FIFO, the processing module (which can be implemented using a RISC processor, which itself can be a disk protocol engine (DPE)) is provided access from across an interface between the disk formatter module and the disk datapath module in order to eliminate wait-states during processor write accesses. When the format field FIFO needs filling, an interrupt to the processing module (e.g., RISC processor/DPE) is generated.

In this embodiment, each element of the format field FIFO includes three (16-bit) words accessed through three ports by the processing module (e.g., RISC processor/DPE) on the other side of the disk formatter/disk datapath interface, in the system clock domain.

The out_sel field controls the selection of an output mux in the disk data router. The aux_ctrl field controls an auxiliary data FIFO interface. The usr_ctrl field controls a user FIFO interface in a disk datapath. The ecc_ctrl field controls an ECC syndrome/symbol computer in a disk formatter. The fld_length/literal/compare field of the current format field element indicates the length of the current FFE. During media control engine execution, an output decoder provides decoded outputs based mainly on the gate_ctrl field and other media control bits of the current format field element.

A special mode of operation is provided to allow the user to define the outputs on all the output decoder ports. Most of these connect to disk formatter output ports at the channel interface. By selecting a particular op-code for the op_ctrl field of the format field element, the value of the fld_length field of the current format field element is directly mapped onto the ports in accordance with a predetermined manner.

Figure 12:
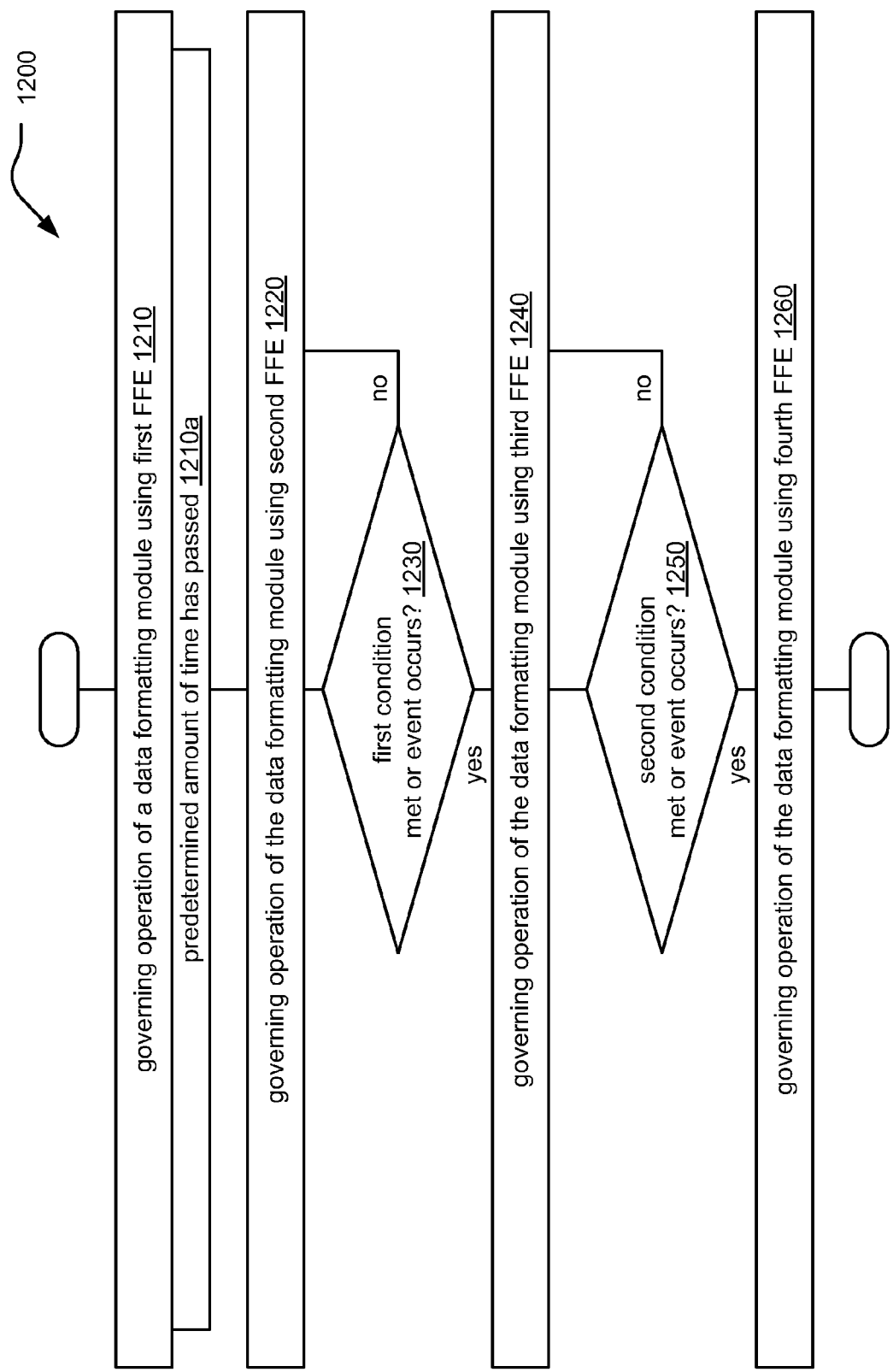

FIG. 12 and FIG. 13 illustrate embodiments of methods for generating format field elements (FFEs) for use in operating a hard disk drive (HDD).

Referring to FIG. 12, the method 1200 begins by governing operation of a data formatting module using a first FFE, as shown in a block 1210. Then, when a predetermined amount of time has passed (as shown in a block 1210*a*), then the method 1200 automatically begins governing operation of the data formatting module using a second FFE, as shown in a block 1220.

The method 1200 continues by determining whether a first condition has been met or a first event occurs, as shown in a decision block 1230. If the first condition has not been met or the first event has not yet occurred, then the method 1200 continues by governing operation of the data formatting module using the second FFE, as shown in the block 1220. However, if the first condition has been met or the first event has in fact occurred, then the method 1200 operates by governing operation of the data formatting module using a third FFE, as shown in a block 1240.

The method 1200 continues by determining whether a second condition has been met or a second event occurs, as shown in a decision block 1250. If the second condition has not been met or the second event has not yet occurred, then the method 1200 continues by governing operation of the data formatting module using the third FFE, as shown in the block 1240. However, if the second condition has been met or the second event has in fact occurred, then the method 1200 operates by governing operation of the data formatting module using a fourth FFE, as shown in a block 1260.

This embodiment shows one possible embodiment of how different bases can be employed to perform the transference of configuration of a particular data formatting module from a first FFE to a second FFE, and from the second FFE to a third FFE, and from the third FFE to a fourth FFE, etc. This shows one possible embodiment of the transference of configuration of only one data formatting module from various FFEs. It is noted that each data formatting module can perform this transference of configuration (e.g., between various FFEs) in accordance with different bases.

Referring to FIG. 13, the method 1300 begins by generating a plurality of FFEs that includes a first FFE, a second FFE, a third FFE, and a fourth FFE, as shown in a block 1310. The method 1300 continues by employing the first FFE to govern operation of a first data formatting module of a plurality of data formatting modules within the HDD during a first time, as shown in a block 1320.

Based on a corresponding opcode within the first FFE, the method 1300 continues by detecting a first condition that, when met, transfers operation of the first data formatting module within the HDD to be governed by the second FFE, as shown in a block 1330. The method 1300 continues by employing the second FFE to govern operation of the first data formatting module of the plurality of data formatting modules within the HDD during a second time, as shown in a block 1340.

The method 1300 continues by employing the third FFE to govern operation of a second data formatting module of the plurality of data formatting modules within the HDD during a third time, as shown in a block 1350. Based on a corresponding opcode within the second FFE, the method 1300 continues by detecting a second condition that, when met, transfers operation of the second data formatting module within the HDD to be governed by the fourth FFE, as shown in a block 1360.

The method 1300 continues by employing the fourth FFE to govern operation of the second data formatting module of the plurality of data formatting modules within the HDD during a fourth time, as shown in a block 1370.

It is noted that the various modules (e.g., encoding modules, decoding modules, processing modules, data formatting modules, etc.) described herein may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The operational instructions may be stored in a memory. The memory may be a single memory device or a plurality of memory devices. Such a memory device may be a read-only memory, random access memory, volatile memory, non-volatile memory, static memory, dynamic memory, flash memory, and/or any device that stores digital information. It is also noted that when the processing module implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. In such an embodiment, a memory stores, and a processing module coupled thereto executes, operational instructions corresponding to at least some of the steps and/or functions illustrated and/or described herein.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. An apparatus that is operable to generate format field elements (FFEs) for use in operating a hard disk drive (HDD), the apparatus comprising:
a plurality of data formatting modules;
a processing module; and
a memory, coupled to the processing module, that is operable to store operational instructions that enable the processing module to:
generate a plurality of FFEs that includes a first FFE, a second FFE, a third FFE, and a fourth FFE, wherein:
the first FFE includes a first parameter by which a first data formatting module of the plurality of data formatting modules operates during a first time and a corresponding opcode within the first FFE indicates a first condition that, when met, transfers operation of the first data formatting module within the HDD to be governed by the second FFE; and
the third FFE includes a second parameter by which a second data formatting module of the plurality of data formatting modules operates during a third time and a corresponding opcode within the third FFE indicates a second condition that, when met, transfers operation of the second data formatting module within the HDD to be governed by the fourth FFE.

2. The apparatus of claim 1, wherein:
the first time includes the third time and a fourth time.

3. The apparatus of claim 1, wherein:
a fifth FFE includes a third parameter by which a third data formatting module of the plurality of data formatting modules operates during the first time.

4. The apparatus of claim 1, wherein:
the first condition is met at a different time that the second condition is met.

5. The apparatus of claim 1, wherein:
the first FFE is provided to a first FIFO buffer of a plurality of first-in-first-out (FIFO) buffers;

the third FFE is provided to a second FIFO buffer of the plurality of FIFO buffers;
a first FIFO of the plurality of FIFO buffers is coupled to the first data formatting module of the plurality of data formatting modules; and
a second FIFO of the plurality of FIFO buffers is coupled to the second data formatting module of the plurality of data formatting modules.

6. The apparatus of claim 1, wherein:
the first data formatting module of the plurality of data formatting modules is a servo control engine;
the second data formatting module of the plurality of data formatting modules is a data event engine;
a third data formatting module of the plurality of data formatting modules is a media control engine; and
a fourth data formatting module of the plurality of data formatting modules is a transfer control engine.

7. The apparatus of claim 1, wherein:
the processing module is a reduced instruction set computer (RISC) processor;
the first FFE is provided from the RISC processor to a first FIFO buffer of a plurality of first-in-first-out (FIFO) buffers;
the third FFE is provided from the RISC processor to a second FIFO buffer of the plurality of FIFO buffers;
a first FIFO of the plurality of FIFO buffers is coupled to the first data formatting module; and
a second FIFO of the plurality of FIFO buffers is coupled to the second data formatting module.

8. The apparatus of claim 1, wherein:
the first FFE and includes a field length field and the opcode corresponding to the first time; and
the field length field defines a length of the first FFE.

9. The apparatus of claim 1, wherein:
at least one of the first condition and the second condition is a predetermined period of time being elapsed.

10. The apparatus of claim 1, wherein:
a plurality of data formatting modules within the HDD includes both the first data formatting module and the second data formatting module; and
at least one of the first condition and the second condition is completion of an operation by one data formatting module of the plurality of data formatting modules.

11. An apparatus that is operable to generate format field elements (FFEs) for use in operating a hard disk drive (HDD), the apparatus comprising:
a plurality of data formatting modules;
a plurality of first-in-first-out (FIFO) buffers such that each FIFO buffer is coupled to one data formatting module;
a processing module; and
a memory, coupled to the processing module, that is operable to store operational instructions that enable the processing module to:
generate a plurality of FFEs that includes a first FFE, a second FFE, a third FFE, and a fourth FFE, wherein:
the first FFE and the second FFE are provided from a reduced instruction set computer (RISC) processor to a first FIFO buffer of the plurality of FIFO buffers;
the first FFE and the second FFE are provided successively to a first data formatting module of the plurality of data formatting modules from the first FIFO buffer;
the third FFE and the fourth FFE are provided from the RISC processor to a second FIFO buffer of the plurality of FIFO buffers;
the third FFE and the fourth FFE are provided successively to a second data formatting module of the plurality of data formatting modules from the second FIFO buffer;
the first FFE includes a first parameter by which the first data formatting module of the plurality of data formatting modules operates during a first time and a corresponding opcode within the first FFE indicates a first condition that, when met, transfers operation of the first data formatting module within the HDD to be governed by the second FFE; and
the third FFE includes a second parameter by which the second data formatting module of the plurality of data formatting modules operates during a third time and a corresponding opcode within the third FFE indicates a second condition that, when met, transfers operation of the second data formatting module within the HDD to be governed by the fourth FFE.

12. The apparatus of claim 11, wherein:
the first time includes the third time and a fourth time.

13. The apparatus of claim 11, wherein:
the first condition is met at a different time that the second condition is met.

14. The apparatus of claim 11, wherein:
the first data formatting module of the plurality of data formatting modules is a servo control engine;
the second data formatting module of the plurality of data formatting modules is a data event engine;
a third data formatting module of the plurality of data formatting modules is a media control engine; and
a fourth data formatting module of the plurality of data formatting modules is a transfer control engine.

15. The apparatus of claim 11, wherein:
the first FFE and includes a field length field and the opcode corresponding to the first time; and
the field length field defines a length of the first FFE.

16. The apparatus of claim 11, wherein:
at least one of the first condition and the second condition is a predetermined period of time being elapsed.

17. The apparatus of claim 11, wherein:
at least one of the first condition and the second condition is completion of an operation by one data formatting module of the plurality of data formatting modules.

18. A method for generating format field elements (FFEs) for use in operating a hard disk drive (HDD), the method comprising:
generating a plurality of FFEs that includes a first FFE, a second FFE, a third FFE, and a fourth FFE;
employing the first FFE to govern operation of a first data formatting module of a plurality of data formatting modules within the HDD during a first time;
based on a corresponding opcode within the first FFE, detecting a first condition that, when met, transfers operation of the first data formatting module within the HDD to be governed by the second FFE;
employing the second FFE to govern operation of the first data formatting module of the plurality of data formatting modules within the HDD during a second time;
employing the third FFE to govern operation of a second data formatting module of the plurality of data formatting modules within the HDD during a third time;
based on a corresponding opcode within the second FFE, detecting a second condition that, when met, transfers operation of the second data formatting module within the HDD to be governed by the fourth FFE; and employing the fourth FFE to govern operation of the second data formatting module of the plurality of data formatting modules within the HDD during a fourth time.

19. The method of claim 18, further comprising:
providing the first FFE and the second FFE to a first first-in-first-out (FIFO) buffer of a plurality of FIFO buffers;
providing the first FFE and the second FFE successively from the first FIFO buffer to the first data formatting module of the plurality of data formatting modules;
providing the third FFE and the fourth FFE to a second FIFO buffer of the plurality of FIFO buffers; and
providing the third FFE and the fourth FFE successively from the second FIFO buffer to the second data formatting module of the plurality of data formatting modules.

20. The method of claim 18, wherein:
at least one of the first condition and the second condition is a predetermined period of time being elapsed or completion of an operation by one data formatting module of the plurality of data formatting modules.

\* \* \* \* \*